US012411457B2

(12) United States Patent
Denden

(10) Patent No.: US 12,411,457 B2
(45) Date of Patent: Sep. 9, 2025

(54) HOROLOGICAL MOVEMENT COMPRISING A CHRONOGRAPH MECHANISM

(71) Applicant: Blancpain SA, Le Brassus (CH)

(72) Inventor: Mehdi Denden, Les Rousses (FR)

(73) Assignee: Blancpain SA, Le Brassus (CH)

( * ) Notice: Subject to any disclaimer, the term of this patent is extended or adjusted under 35 U.S.C. 154(b) by 414 days.

(21) Appl. No.: 18/163,350

(22) Filed: Feb. 2, 2023

(65) Prior Publication Data

US 2023/0418225 A1 Dec. 28, 2023

(30) Foreign Application Priority Data

Jun. 23, 2022 (EP) .................................... 22180625

(51) Int. Cl.
*G04B 19/02* (2006.01)
*G04F 7/08* (2006.01)

(52) U.S. Cl.
CPC ........... *G04B 19/02* (2013.01); *G04F 7/0804* (2013.01)

(58) Field of Classification Search
CPC ........ G04F 7/08; G04F 7/0804; G04F 7/0823; G04F 7/0842; G04F 7/0866; G04B 19/02
See application file for complete search history.

(56) References Cited

U.S. PATENT DOCUMENTS

| | | | | |
|---|---|---|---|---|
| 5,220,541 A * | 6/1993 | Vuilleumier | G04F 7/0847 368/110 |
| 2004/0066711 A1* | 4/2004 | Haefeli | G04F 7/08 368/101 |
| 2017/0068223 A1* | 3/2017 | Kruttli | G04F 7/08 |
| 2019/0271952 A1 | 9/2019 | Wiederrecht et al. | |
| 2022/0287422 A1* | 9/2022 | Forsey | G04B 47/044 |
| 2024/0427288 A1* | 12/2024 | Forsey | G04B 1/22 |

FOREIGN PATENT DOCUMENTS

| | | |
|---|---|---|
| CH | 703 797 B1 | 3/2012 |
| CH | 716 841 A1 | 5/2021 |
| EP | 3 324 249 A1 | 5/2018 |

OTHER PUBLICATIONS

European Preliminary Search Report Issued Oct. 28, 2022 in European Application 22 18 0625 filed on Jun. 23, 2022 (with English Translation of Categories of Cited Documents), 3 pages.

* cited by examiner

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A horological movement including a running train driven by a first energy source; a regulating member for regulating the running train; a chronograph mechanism including a chronograph train driven by a second energy source; a coupling configured to couple the chronograph train, on demand, to the regulating member to regulate the chronograph train using the regulating member; a chronograph start/stop control device cooperating with the coupling; wherein the coupling is a differential coupling including a first input wheel driven by the running train and having a rotational speed that is regulated by the regulating member; an output wheel meshed with the chronograph train; a second idle input wheel cooperating directly or indirectly with the chronograph start/stop control device; the coupling including a drive assembly configured to rotate the output wheel at the rotational speed regulated by the regulating member.

16 Claims, 2 Drawing Sheets

HOROLOGICAL MOVEMENT COMPRISING A CHRONOGRAPH MECHANISM

CROSS-REFERENCE TO RELATED APPLICATION

This application claims priority to European Patent Application No. 22180625.0 filed on Jun. 23, 2022, the entire disclosure of which is hereby incorporated herein by reference.

TECHNICAL FIELD OF THE INVENTION

The present invention relates to a horological movement comprising a chronograph mechanism.

The invention more particularly relates to a horological movement comprising a chronograph mechanism cooperating with an auxiliary energy source that is not a primary energy source dedicated to the movement and to the indication of the time.

More particularly, the invention relates to a coupling for quickly coupling the regulating member of the horological movement to the chronograph mechanism when the chronograph mechanism is activated.

The invention further relates to a timepiece comprising such a horological movement.

TECHNOLOGICAL BACKGROUND

Existing mechanical horological movements comprising a chronograph mechanism have drawbacks, such as the variation in the rate of the movement or the variation in the amplitude of the regulating member between the different activation states of the chronograph mechanism, for example between the working and stopped states of the chronograph.

These variations in the rate of the movement or the isochronism of the regulating member are due at least in part to the fact that the energy consumed is not the same depending on the function of the chronograph mechanism that is triggered (in particular whether it is working or stopped).

One of the solutions proposed to overcome this drawback consists of separating the chronograph train from the primary energy source of the running train of the horological movement, in order to dedicate this energy source exclusively to the running train and the time indication. Thus, the power reserve of the horological movement does not depend on the activation state (working or stopped) of the chronograph mechanism.

Such a solution is described in particular in the Swiss patent No. 703 797 B1. This document describes the use of a main barrel driving a running train actuating an hour display and a minute display, a regulating member comprising a sprung balance and an escapement, regulating the running train, as well as the use of a secondary barrel dedicated to the chronograph mechanism and to driving a chronograph train. A coupling is used to couple and regulate the chronograph train using the regulating member of the movement when the chronograph mechanism is activated via a chronograph start/stop control device.

The proposed coupling comprises a wolf-tooth integral with the escape wheel cooperating with a coupling wheel set carrying a jumping seconds pinion shaft, a first star-wheel with 6 teeth integral with the jumping seconds pinion and a second star-wheel with six teeth mounted free on the jumping seconds pinion shaft and connected to the first star-wheel by a pin passing through an oblong slot in the second star-wheel.

However, such a coupling is complex to produce, cumbersome and requires the escape wheel, which is an extremely sensitive part in a horological movement, to be made more complex.

Moreover, the energy consumption of such a coupling differs between whether the chronograph movement is working or stopped, which causes problems.

There is thus a need to improve horological movements equipped with a chronograph mechanism powered by an energy source that is not the primary energy source of the running train for indicating the time.

SUMMARY OF THE INVENTION

In this context, the invention proposes a horological movement comprising a chronograph mechanism and a coupling enabling the chronograph mechanism to be coupled on demand, instantaneously, and with low motive energy consumption, to the regulating member of the movement.

In this context, the invention relates to a horological movement comprising:

- a running train dedicated to the time division of said horological movement, said running train being driven by a first energy source;
- a regulating member for regulating the running train;
- a chronograph mechanism comprising a chronograph train driven by a second energy source;
- a coupling configured to couple the chronograph train, on demand, to the regulating member to regulate the chronograph train using the regulating member;
- a chronograph start/stop control device cooperating with the coupling;

characterised in that the coupling is a differential coupling comprising:

- a first input wheel driven by said running train and having a rotational speed that is regulated by the regulating member;
- an output wheel meshed with said chronograph train;
- a second input wheel, which is an idle wheel, cooperating directly or indirectly with the chronograph start/stop control device;

the coupling comprising a drive assembly configured to rotate the output wheel at said rotational speed regulated by the regulating member, when the rotation of the second input wheel is blocked by the chronograph start/stop control device.

In addition to the features mentioned in the preceding paragraph, the horological movement according to the invention can have one or more complementary features from among the following, considered either on an individual basis or according to any combination technically possible:

- the differential coupling is a differential ball coupling;
- the first input wheel is integrated into the running train;
- the output wheel is parallel to the first input wheel, the output wheel meshing directly or indirectly with the chronograph train;
- the first input wheel and the output wheel are coaxial;
- the drive assembly is formed by balls carried by the second input wheel and configured to roll between the first input wheel and the output wheel, and by a resilient element configured to push the first input wheel and the output wheel towards one another, so as to generate a non-slip rolling of the balls in contact with the first input wheel and the output wheel;

the resilient element is a spring washer;

said running train drives an hour display and a minute display;

the second energy source is dedicated to the chronograph train;

said second energy source is a barrel;

the chronograph train comprises a chronograph minute counter and a chronograph seconds counter;

the chronograph train comprises a fraction-of-second counter;

the chronograph mechanism comprises a zero-reset mechanism for zero-resetting at least one of the chronograph counters comprised in the chronograph train;

the regulating member comprises a high-frequency oscillator with an oscillation frequency greater than or equal to 5 Hz;

the chronograph start/stop control device comprises a coupling yoke configured to block the free rotation of the second input wheel when a start/stop control member is activated.

Another aspect of the invention relates to a timepiece comprising such a horological movement according to the invention. The timepiece is preferably a wristwatch comprising a watch case configured to receive and house the horological movement according to the invention.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

Figure 1:
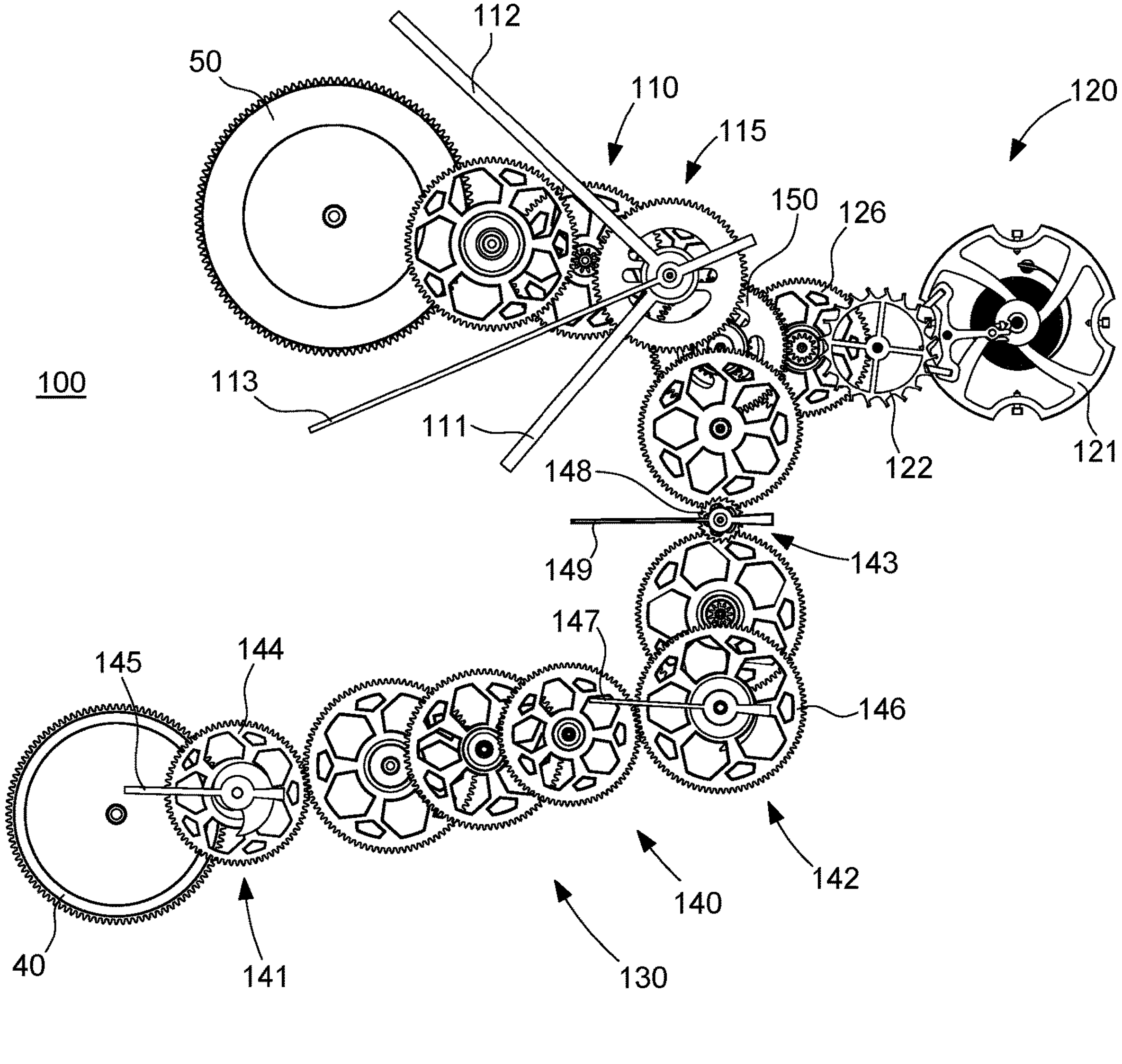
FIG. 1 is a diagrammatic, plan view of a horological movement according to the invention.

FIG. 1 shows a diagrammatic, plan view of a horological movement 100 according to the invention.

Figure 2:
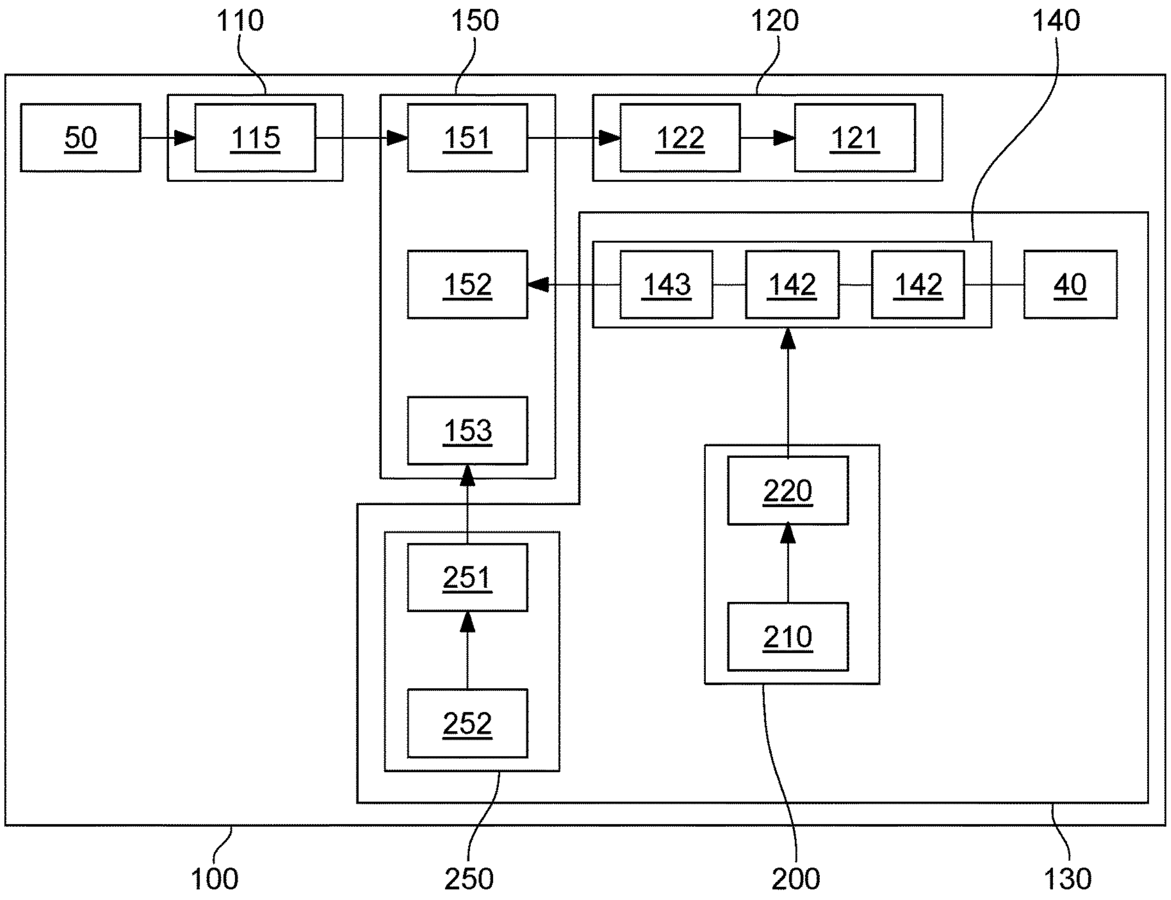
FIG. 2 is a functional block diagram of the horological movement according to the invention shown in FIG. 1.

FIG. 2 is a functional block diagram of the horological movement 100, according to the invention, shown in FIG. 1, illustrating the interactions between the various elements of the horological movement 100 which will be described hereinbelow.

The horological movement 100 according to the invention comprises a running train 110 dedicated to time division, and driven by a first energy source 50, referred to as the primary energy source.

The first energy source 50 is, for example, a barrel which constitutes a reserve of energy to power the running train 110.

The running train 110 drives the hands of a time display, in particular an hour hand 111 cooperating with an hour graduation, a minute hand 112 cooperating with a minute graduation, and a seconds hand 113, or trotteuse hand, cooperating with a seconds graduation.

The running train 110 conventionally comprises an hour wheel carrying the hour hand 111 of the time display, a minute wheel carrying the minute hand 112 of the time display and a seconds wheel carrying the seconds hand 113 of the time display.

The running train 110 can further comprise intermediate wheel sets as required.

The running train 110 is regulated by a regulating member 120.

The regulating member 120 conventionally comprises an oscillator 121 and an escapement 122.

The oscillator 121 is an electrical or mechanical oscillator.

For example, the oscillator 121 is a mechanical sprung-balance type oscillator. Such a sprung balance has, for example, an oscillation frequency of between 2.5 and 4 Hz.

For example, the oscillator 121 is a high-frequency electrical or mechanical oscillator, i.e. oscillating at a frequency greater than 4 Hz.

For example, the oscillator 121 is a high-frequency electrical or mechanical oscillator, i.e. oscillating at a frequency greater than or equal to 5 Hz.

The horological movement 100 further comprises a chronograph mechanism 130.

The chronograph mechanism 130 comprises a chronograph train 140 driven by a second energy source 40, referred to as the secondary energy source, which is different from the primary energy source 50.

Thus, the entire chronograph train 140 is powered by the second energy source 40, independently of the first energy source actuating the running train 110.

Preferably, this second energy source 40 is dedicated to driving the chronograph train 140. However, this second energy source 40 can also be used to power an additional complication of the horological movement 100.

The second energy source 40 is, for example, a barrel which constitutes a reserve of energy dedicated to the chronograph train 140. The barrel is thus dimensioned so as to provide the energy required to operate the chronograph mechanism 130.

Thus, when the first energy source 50 and the second energy source 40 are barrels, all of the energy consumed by the chronograph train 140 is output by the second barrel 40 and all of the energy of the first barrel is used solely for the running train 110, thus increasing the power reserve of the running train 110.

The chronograph train 140 in particular comprises a chronograph minute counter 141 and a chronograph seconds counter 142.

The chronograph minute counter 141 comprises a minute counter wheel 144 driving a chronograph minute hand 145.

The chronograph seconds counter 142 comprises a seconds counter wheel 146 driving a chronograph seconds hand 147.

In the example shown, the chronograph train 140 further comprises a fraction-of-second counter 143, or a jumping seconds counter, having a jumping seconds pinion 148 driving a chronograph jumping seconds hand 149.

The chronograph train 140 comprises intermediate chronograph wheel sets in order to obtain the desired ratios between the different counters 141, 142, 143. Moreover, the chronograph train 140 can further comprise additional intermediate wheel sets depending on the needs and architectures of the movement and the layout of the minute counter 141, seconds counter 142 and jumping seconds counter 143 in the horological movement 100.

The minute counter 141, seconds counter 142 and jumping seconds counter 143 conventionally comprise a zero-reset cam, for example in the shape of a snail, heart or the like, for zero-resetting the counters to a reference position by means of a chronograph counter zero-reset mechanism 200 (visible in the block diagram in FIG. 2).

The zero-reset mechanism 200 conventionally comprises a zero-reset control 210 that can be operated by the user, for example via a push-button or an actuating pin. The zero-reset control 210 cooperates directly or indirectly with a zero-reset hammer 220 cooperating with the respective zero-reset cams of the different counters 141, 142, 143.

As the zero-reset mechanism 200 is a conventional chronograph counter zero-reset mechanism known to a person skilled in the art, it does not require further description in order for the invention to be implemented.

The horological movement 100 comprises a coupling 150 configured to:

- couple the chronograph train 140, on demand, to the regulating member 120 of the horological movement 100 in order to be able to regulate the chronograph train 140, and consequently the various chronograph counters 141, 142, 143, in rhythm with the regulating member 120;
- uncouple the chronograph train 140 from the regulating member 120 to stop the chronograph train 140 and the various hands 145, 147, 149 of the chronograph counters 141, 142, 143.

Thus, the coupling 150 allows the chronograph train 140 to be kinematically linked, on demand, to the escapement 122 via a chronograph start/stop control device 250.

Figure 3:
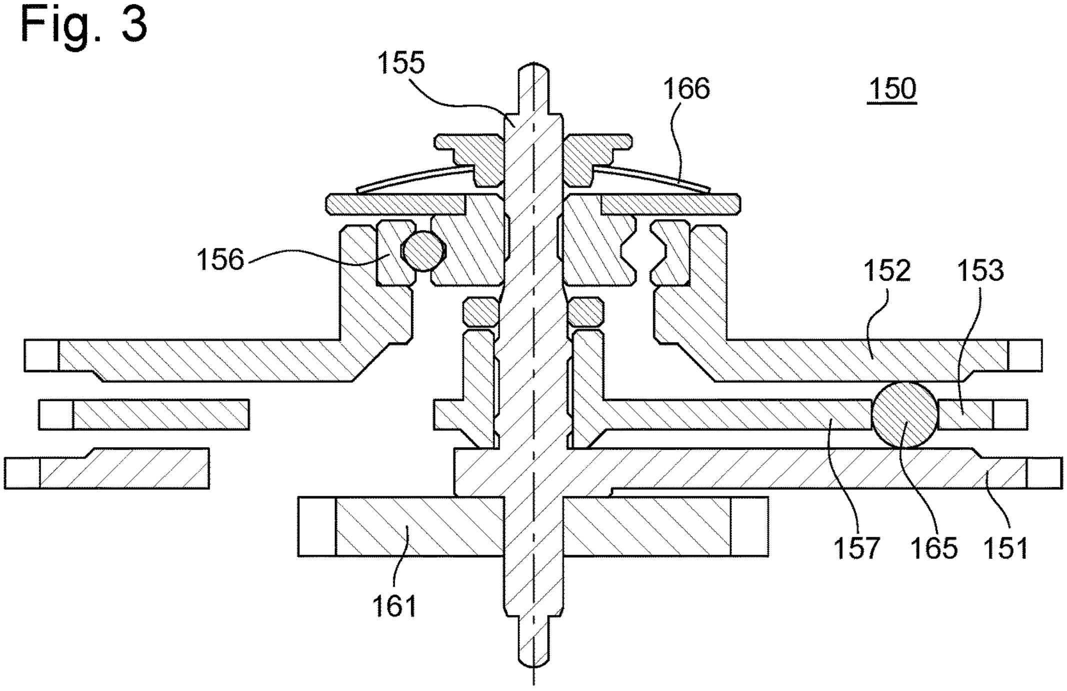
FIG. 3 is a sectional view of a differential coupling of the horological movement according to the invention.

FIG. 3 is a sectional view of a coupling 150 of the horological movement 100 according to the invention.

The coupling 150 is a differential coupling, whose first input is the running train 110, whose second input is the chronograph start/stop control device 250, and whose output is the chronograph train 140.

More particularly, the differential coupling 150 comprises:

- a first input wheel 151 driven by the running train 110 and thus having a rotational speed that is regulated by the regulating member 120;
- an output wheel 152 meshed with said chronograph train 140;
- a second input wheel 153, which is an idle wheel, cooperating directly or indirectly with the chronograph start/stop control device 250.

The output wheel 152 is parallel to the first input wheel 151.

Preferably, the first input wheel 151 and the output wheel 152 are coaxial.

Preferably, the first input wheel 151, the second input wheel 153 and the output wheel 152 are coaxial.

The differential coupling 150 further comprises a drive assembly 165, 166 configured to rotate the output wheel 152 at said rotational speed regulated by the regulating member 120, when the rotation of the second input wheel 153 is blocked by the chronograph start/stop control device 250.

Preferably, the differential coupling 150 is a differential ball coupling. Thus, the drive assembly is formed by the cooperation of balls 165 and of a resilient element, formed by a spring washer 166, ensuring the non-slip rolling of the balls 165 on the first input wheel 151 and the output wheel 152.

The first input wheel 151 is integral with a coupling shaft 155. An input pinion 161 is riveted to the coupling shaft 155 such that the input pinion 161 and the first input wheel 151 form an input wheel set.

For example, the input wheel set is integrated into the running train 110. In the example embodiment, the input wheel set is inserted between a seconds wheel set 115 of the running train 110 and a multiplier wheel set 116 meshed with the escapement 122. Thus, the input wheel set is integrated into a first kinematic chain formed by the entire gear train between the first energy source 50 and the regulating member 120.

More specifically, the first input wheel 151 is meshed with the multiplier wheel 116 and the input pinion 161 is meshed with the seconds wheel set 115 of the running train 110.

The output wheel 152 of the differential coupling 150 is at the end of the kinematic chain of the chronograph train 140. Thus, a second kinematic chain is formed between the second energy source 40 and the differential coupling 150, and particularly the output wheel 152.

The output wheel 152 is mounted free about the coupling shaft 155, for example by means of a ball bearing 156.

The second input wheel 153 is an idle wheel mounted to rotate freely about the coupling shaft 155. The second input wheel 153 controls the coupling between the first input wheel 151 and the output wheel 152.

The balls 165 that drive the rotation of the output wheel 152 are disposed through the plate 157 of the second input wheel 153. The balls 165 bear against the first input wheel 151 and against the output wheel 152.

The first input wheel 151 and the output wheel 152 are kept stressed by the spring washer 166 ensuring a non-slip rolling of the balls 165 on the plate of the first input wheel 151 and on the plate of the output wheel 152.

Such a differential coupling 150 thus allows, when the chronograph mechanism 130 is activated by the chronograph start/stop control device 250, the chronograph train 140 to be coupled, by the output wheel 152, to the running train 110 regulated by the regulating member 120 via the first input wheel 151.

The chronograph start/stop control device 250 comprises a start/stop control member 252 setting into motion a coupling yoke 251 which is configured to block the free rotation of the second input wheel 153. The start/stop control member 252 can be formed by the assembly of a start control and a stop control, the two controls not necessarily being combined into a single member.

The coupling by blocking the rotation of the second input wheel 153 allows the output wheel 152 to be driven such that it rotates with the regulation of the regulating member 120 of the running train 110.

Such driving is possible thanks to the non-slip rolling of the balls 165 on the respective plates of the first input wheel 151 and of the output wheel 152.

In the configuration shown, the first input wheel 151 and the output wheel 152 have the same speed and rate of rotation, but rotate in opposite directions.

When the chronograph mechanism 130 is stopped, the coupling yoke 251 releases the second input wheel 153 so as to leave it able to rotate freely. As a result, the output wheel 152 and the first input wheel 151 are uncoupled. In this stopped position of the chronograph mechanism 130, the output wheel 152 is at a stop, and the two input wheels 151, 153 are moving in rotation.

The chronograph start/stop control device 250 can further comprise conventional means for holding the chronograph counters in position when the chronograph is stopped.

Such a differential coupling 150, which preferably contains balls such as that presented in the present application, allows a complication, for example a chronograph mechanism 130, having a dedicated energy source 40, to be regulated on demand.

Such a differential coupling 150 thus dispenses with the need to use a second regulating member with the synchronisation complications associated therewith.

The differential coupling 150 according to the invention enables a complication, in this case a chronograph mechanism 130, to be coupled and uncoupled very quickly.

The differential coupling 150 according to the invention is a reactive, high-precision coupling thanks to the reliable clearances to be overcome between the coupled position (active chronograph mechanism) and the uncoupled position (inactive chronograph mechanism) of the coupling.

As a result, such a differential coupling is particularly adapted for a horological movement comprising a high-frequency oscillator and/or a chronograph mechanism with a foudroyante (jumping second) displaying the second-divisions. More specifically, these two example applications require a high degree of reactivity from such a coupling, given the very small time division (fraction of a second) and/or the high frequency of the oscillations of a high-frequency oscillator.

The invention further relates to a timepiece, for example a wristwatch, comprising such a horological movement.

The invention claimed is:

1. A horological movement comprising:

a running train dedicated to the time division of said horological movement, said running train being driven by a first energy source;

a regulating member for regulating the running train;

a chronograph mechanism comprising a chronograph train driven by a second energy source;

a coupling configured to couple the chronograph train, on demand, to the regulating member to regulate the chronograph train using the regulating member;

a chronograph start/stop control device cooperating with the coupling;

characterised in that wherein the coupling is a differential coupling comprising:

a first input wheel driven by said running train and having a rotational speed that is regulated by the regulating member;

an output wheel meshed with said chronograph train;

a second input wheel, which is an idle wheel, cooperating directly or indirectly with the chronograph start/stop control device;

the coupling comprising a drive assembly configured to rotate the output wheel at said rotational speed regulated by the regulating member, when the rotation of the second input wheel is blocked by the chronograph start/stop control device.

2. The horological movement according to claim 1, wherein said differential coupling is a differential ball coupling.

3. The horological movement according to claim 1, wherein the first input wheel is integrated into the running train.

4. The horological movement according to claim 1, wherein the output wheel is parallel to the first input wheel, the output wheel meshing directly or indirectly with the chronograph train.

5. The horological movement according to claim 1, wherein the first input wheel and the output wheel are coaxial.

6. The horological movement according to claim 1, wherein the drive assembly is formed by balls carried by the second input wheel and configured to roll between the first input wheel and the output wheel, and by a resilient element configured to push the first input wheel and the output wheel towards one another, so as to generate a non-slip rolling of the balls in contact with the first input wheel and the output wheel.

7. The horological movement according to claim 6, wherein the resilient element is a spring washer.

8. The horological movement according to claim 1, wherein said running train drives an hour display and a minute display.

9. The horological movement according to claim 1, wherein said second energy source is dedicated to the chronograph train.

10. The horological movement according to claim 1, wherein said second energy source is a barrel.

11. The horological movement according to claim 1, wherein the chronograph train comprises a chronograph minute counter and a chronograph seconds counter.

12. The horological movement according to claim 11, wherein the chronograph mechanism comprises a zero-reset mechanism for zero-resetting at least one of the chronograph counters comprised in the chronograph train.

13. The horological movement according to claim 1, wherein the chronograph train comprises a fraction-of-second counter.

14. The horological movement according to claim 1, wherein the regulating member comprises a high-frequency oscillator with an oscillation frequency greater than or equal to 5 Hz.

15. The horological movement according to claim 1, wherein the chronograph start/stop control device comprises a coupling yoke configured to block the free rotation of the second input wheel when a start/stop control member is activated.

16. A timepiece comprising a horological movement according to claim 1.

* * * * *